Apr. 3, 1923.

L. ATWOOD

VARIABLE TRACTOR WHEEL

Filed Aug. 6, 1920

1,450,626

Inventor,
Leonard Atwood;
By A. B. Lepham,
Attorney.

Patented Apr. 3, 1923.

1,450,626

UNITED STATES PATENT OFFICE.

LEONARD ATWOOD, OF BOSTON, MASSACHUSETTS.

VARIABLE TRACTOR WHEEL.

Application filed August 6, 1920. Serial No. 401,635.

*To all whom it may concern:*

Be it known that I, LEONARD ATWOOD, a citizen of the United States, and a resident of Boston, in the county of Suffolk and Commonwealth of Massachusetts, have invented certain new and useful Improvements in Variable Tractor Wheels, of which the following is a full, clear, and exact specification.

This invention relates to driving wheels for use upon tractors, trucks and other self-propelled vehicles, whether for transporting goods or freight upon the highway, or doing work in the field such as ploughing, harrowing, seeding or otherwise, or moving the products of the farm from the field to the market.

It is a well known fact that an ordinary smooth faced tractor wheel, whether of iron, steel, wood or rubber, possesses only limited tractive force under ordinary conditions; and under some conditions none of any value, as, for instance, upon snow, ice, or even grass or clay roads when wet; and such smooth faced wheels are valueless for plowing, harrowing and other work upon the farm.

Metal wheels having lugs or spades riveted or bolted to the wheel rims are in general use for overcoming the objections to smooth faced wheels; but these are open to the objections of destroying the highway and grass land, and are unfit for use upon bridges, planking and stone floors.

The object of my invention is the construction of a wheel which shall be open to none or above-recited objections, but which shall, to the contrary, be capable of being changed at the will of the chauffeur to a smooth-faced wheel, or to one having very pronounced lugs or spades, or to any degree intermediate thereof.

Figure 1:
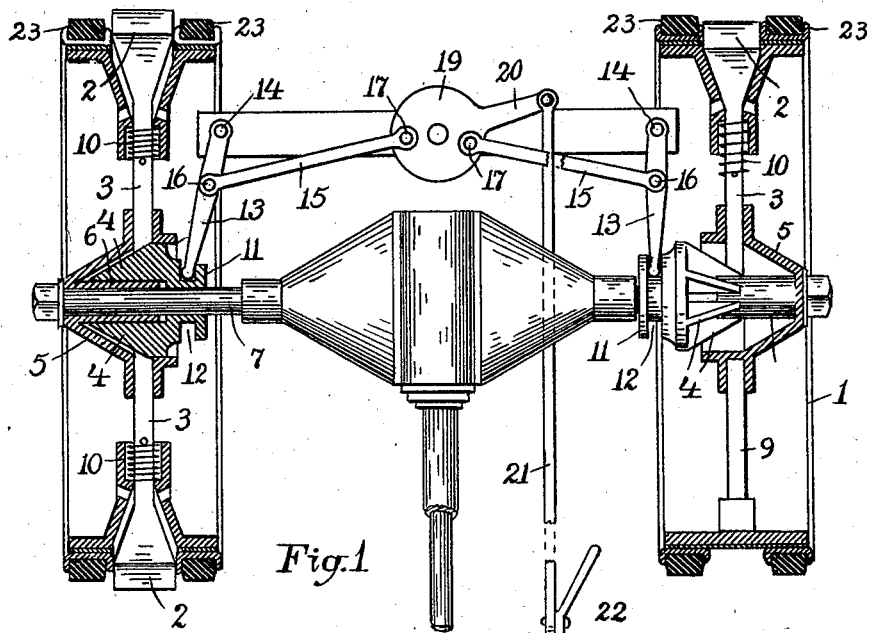
Figure 2:
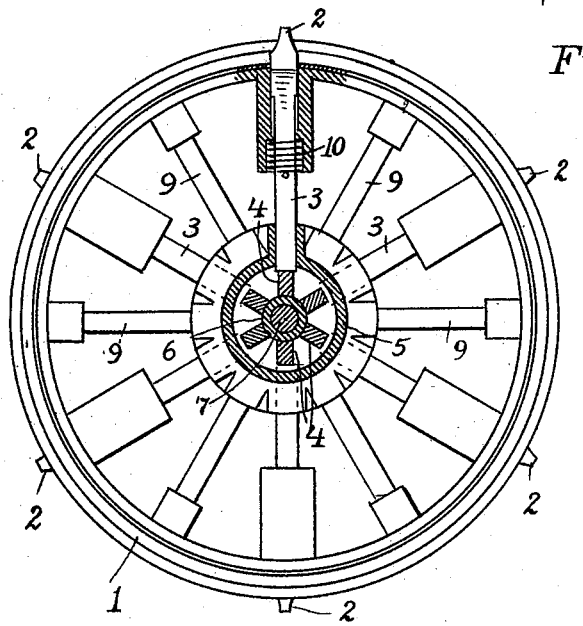
Figure 3:
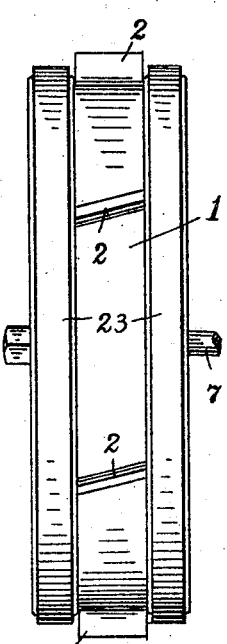

In the drawings forming part of this specification, Fig. 1 is a sectional plan view of a pair of driving wheels embodying my improvements. Fig. 2 is a side elevation of the wheel partially shown in section. Fig. 3 is a tread-view of the wheel.

As shown in Fig. 1, each drive wheel 1 is provided with a plurality of spades 2 having shanks 3 radially slidable in suitable bearings, and controlled by a cone, or wedges 4 in the hub of the wheel. The inner end of each shank 3 rests against the sloping edge of a wedge 4, so that by moving the latter axially, the spade 2 on the outer end of the shank will be slid back into or out from the tread 1.

The wheel hub 5 is made conical and also integral with a sleeve 6 mounted on the axle 7, whereby to strongly support the same. Preferably alternating with the shanks 3 are the spokes 9 of the wheel, suitably uniting the hub and the rim. A helical spring 10 is provided for each shank for keeping it in constant engagement with its operating wedge 4, so that the latter forces the spade outward, and the spring brings it back as the wedge is withdrawn.

For the operation of the wedges, they are either made integral with or attached to a head 11 having an annular groove 12 therein. The outer end of a lever arm 13 enters each groove 12, the lever arms being pivotally supported at 14 and actuated through connecting rods 15 attached at 16 to the arms and at 17 to an oscillating member 19. The latter is provided with an operating arm 20 to which is attached a rod 21 whose other end is designed to be in the control of the chauffeur, as by a lever 22 within his easy reach. When the lever 22 is pressed in one direction, the wedges 4 are forced into the hubs 5 and the spades 2 of both drive wheels are pushed outwardly therefrom, while an opposite movement of the lever causes the spades to be retracted.

I prefer to provide the wheel with two spaced rubber tires 23, with the spades 2 located between them, whereby I secure the resilience of the rubber together with the tractive pull of the spades. With the latter wholly retracted, the wheel operates precisely like an ordinary dual tread wheel.

What I claim is:

1. A wheel having radially movable spades, a conical hub, a rim, spokes rigidly connecting said rim and hub, a cylindrical sleeve within said hub, a plurality of wedges equal in number to said spades and rigidly connected but slidable on said sleeve, shanks each carrying one of said spades and yieldingly pressed against the slanting edge of one of said wedges, and means for sliding said wedges along said sleeve for forcing said spades radially outward.

2. A traction wheel comprising rim, spokes, radially movable spades, a hub, an axially movable tapering member, the hub consisting of a cylindrical shell and a conical shell integral therewith, and an axle within said cylindrical shell, said spades having shanks radially movable in the base of said conical shell and interspersed between said spokes, said tapering member being disposed to be wholly housed within said conical shell when said spades are pressed thereby to their outermost limit.

In testimony that I claim the foregoing invention, I have hereunto set my hand this 17th day of June, 1920.

LEONARD ATWOOD.